(12) United States Patent  (10) Patent No.: US 8,120,898 B2
Liu et al.  (45) Date of Patent: Feb. 21, 2012

(54) ELECTRONIC DEVICE

(75) Inventors: Tsung-Chin Liu, Taipei County (TW);
Yung-Yu Lu, Taoyuan County (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 205 days.

(21) Appl. No.: 12/759,864

(22) Filed: Apr. 14, 2010

(65) Prior Publication Data
US 2011/0141667 A1 Jun. 16, 2011

(30) Foreign Application Priority Data

Dec. 10, 2009 (TW) .............................. 98142217 A

(51) Int. Cl.
*G06F 1/16* (2006.01)
(52) U.S. Cl. ................... 361/679.27; 710/104; 248/550; 345/502; 165/185

(58) Field of Classification Search ................ 710/1, 38, 710/14, 52, 104, 301; 361/679.27, 679.21, 361/679.32, 679.02, 679.09, 679.4, 679.48, 361/679.58, 679.47, 679.33, 679.31; 248/286.1, 248/206.5, 125.9, 550, 27.1, 220.21, 590; 345/174, 167, 173, 175, 213, 502, 207; 165/80.4, 165/104.26, 122, 185
See application file for complete search history.

(56) References Cited

U.S. PATENT DOCUMENTS

| 6,785,128 | B1 * | 8/2004 | Yun ......................... 361/679.27 |
| 7,611,113 | B2 * | 11/2009 | Lai .............................. 248/286.1 |
| 2009/0234975 | A1 * | 9/2009 | Chang et al. ...................... 710/1 |

* cited by examiner

*Primary Examiner* — Hung Duong
(74) *Attorney, Agent, or Firm* — Thomas|Kayden

(57) ABSTRACT

An electronic device is provided. The electronic device includes a base, a first cover and a second cover. The first cover is rotatably disposed on the base between a first position and a second position. When the first cover is at the first position, the cover is closed relative to the base, and when the first cover is at the second position, the cover is open relative to the base. The second cover is movably disposed on the base between a third position and a fourth position. When the first cover is rotated from the first position to the second position, the second cover is pushed thereby from the third position to the fourth position.

20 Claims, 5 Drawing Sheets

ELECTRONIC DEVICE

CROSS REFERENCE TO RELATED APPLICATIONS

This Application claims priority of Taiwan Patent Application No. 098142217, filed on Dec. 10, 2009, the entirety of which is incorporated by reference herein.

BACKGROUND OF THE INVENTION

1. Field of the Invention

The invention relates to an electronic device, and in particular, to an electronic device comprising a hidden hinge.

2. Description of the Related Art

Referring to FIG. 1, the conventional electronic device 10 (for example a portable electronic computer) comprises a base 20, a cover 30 and a plurality of connecting ports 40. The cover 30 is rotatable relative to the base 20 according to a hinge 50 to allow opening and closing. A plurality of connecting ports 40 is disposed on the rear side, left side and right side of the base 20 according to different requirements.

Nowadays, the electronic device 10 has to be designed so that satisfying the trend of miniaturization (i.e. thin and lightweight. However, the thickness H1' of the base 20 of the electronic device 10 can only decrease up until the height H2' of the connecting ports 40. Otherwise, the connecting ports 40 would either protrude from the base 20 or no longer be able to be disposed at the side of the base 20. As a result, generally, thickness of the base 20 is limited by the height of the connecting ports 40, thus, hindering miniaturization.

BRIEF SUMMARY OF THE INVENTION

Accordingly, an electronic device is provided. The electronic device comprises a base, a first cover and a second cover. The first cover is rotatably disposed on the base between a first position and a second position. When the first cover is at the first position, the cover is closed relative to the base, and when the first cover is at the second position, the cover is open relative to the base. The second cover is movably disposed on the base between a third position and a fourth position. When the first cover movies rotated from the first position to the second position, the second cover is pushed thereby from the third position to the fourth position.

Another electronic device is provided comprising a base, a first cover, a second cover, at least one connecting port and an elastic member. The base comprises an opening. The first cover is rotatably disposed on the base between a first position and a second position. When the first cover is at the first position, the cover is closed relative to the base, and when the first cover is at the second position, the cover is open relative to the base. The second cover is movably disposed on the base between a third position and a fourth position and comprises an opening corresponding to the opening of the base to form an accommodating space. The connecting port is disposed in the accommodating space. The elastic member comprises two ends respectively connected with the base and the second cover. When the first cover is rotated from the first position to the second position, the second cover is pushed thereby from the third position to the fourth position.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
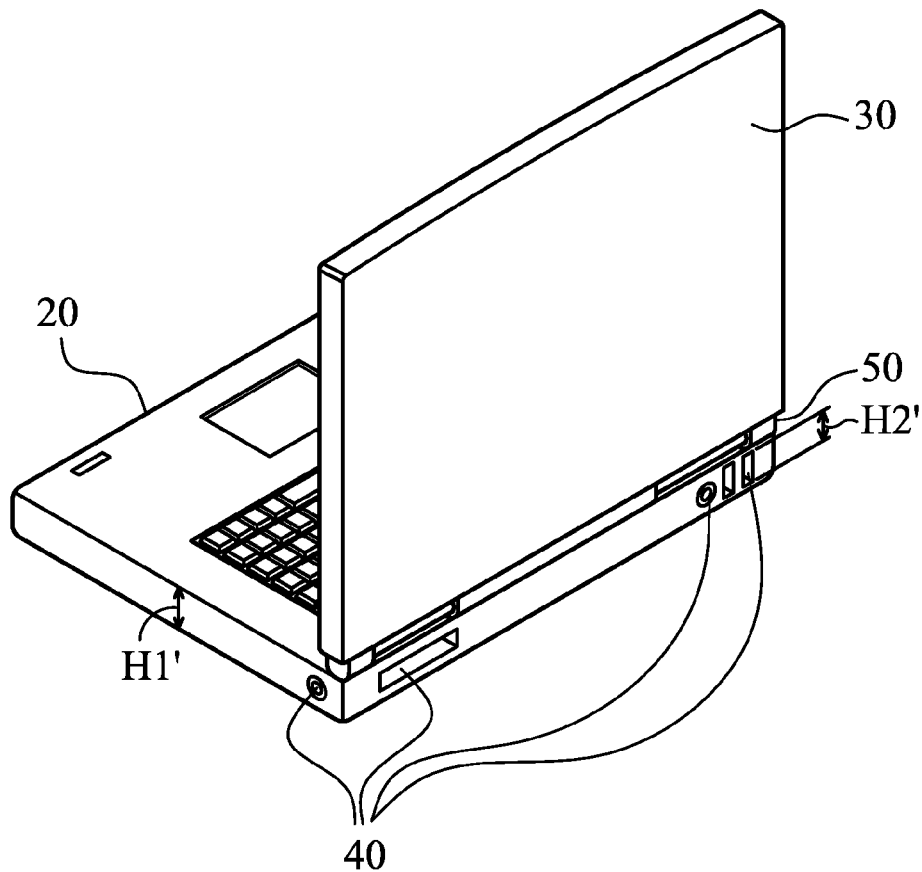
FIG. 1 is a schematic view of a conventional electronic device.
Figure 2A:
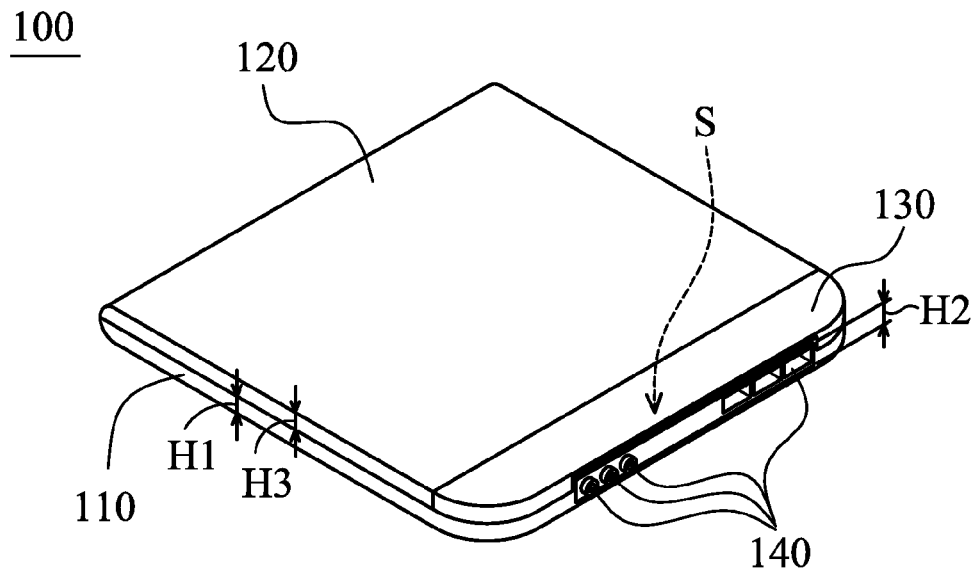
FIGS. 2A and 2B are schematic views showing a closed status and an open status of an electronic device of the invention.
Figure 2B:
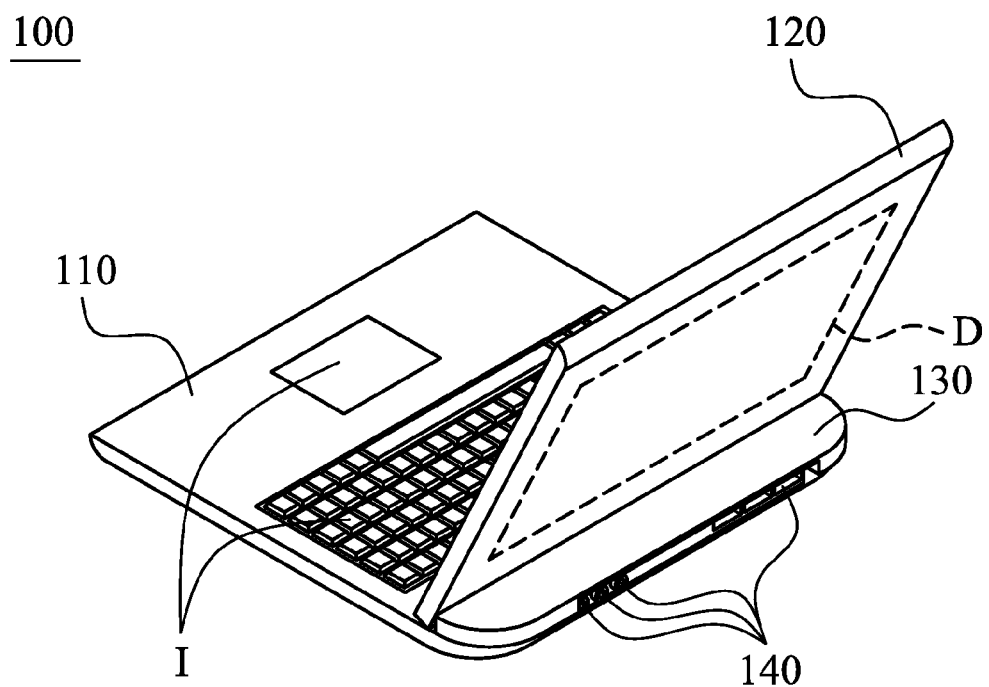
Figure 4A:
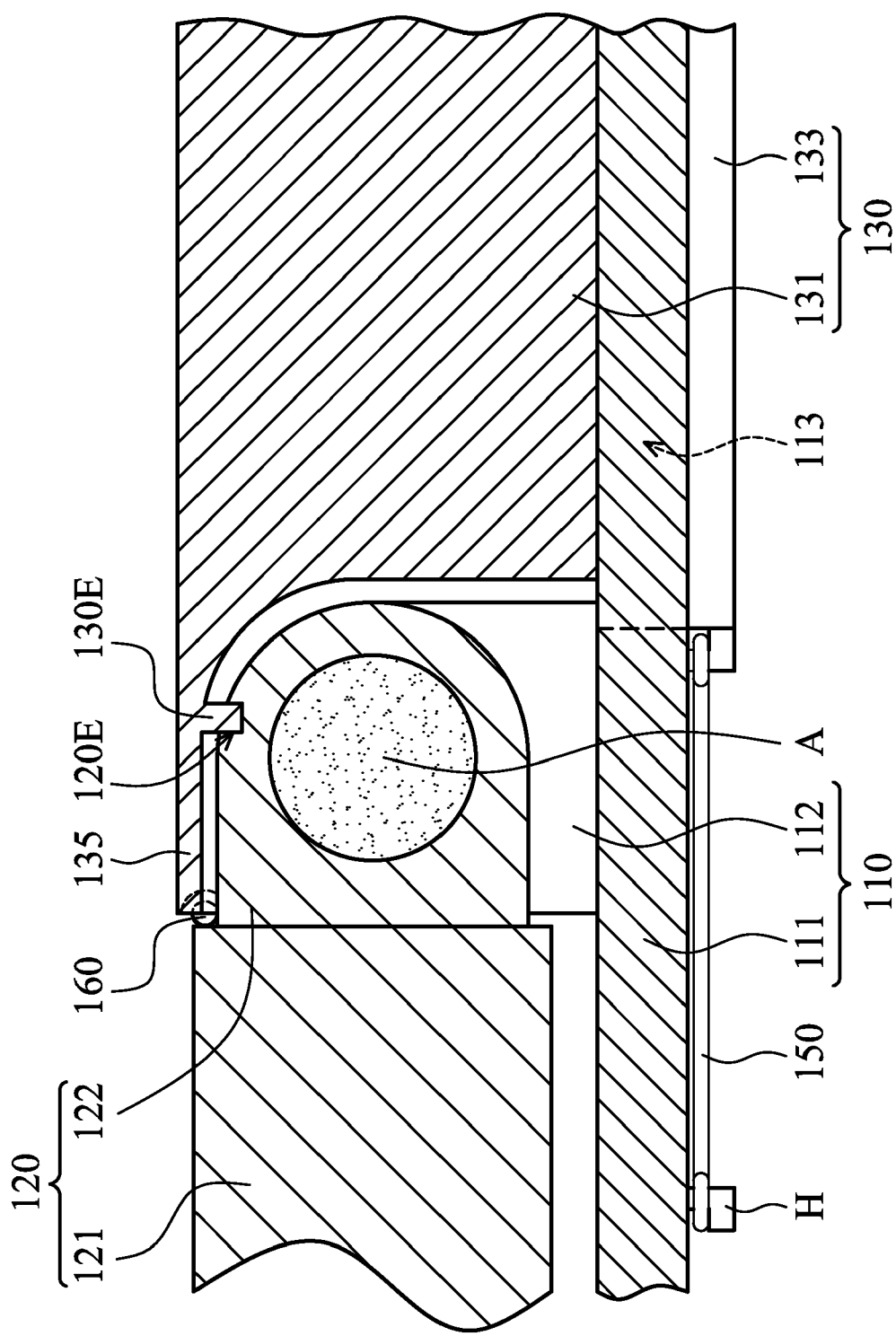
FIGS. 4A and 4B are sectional views showing the closed status and the open status of the electronic device of the invention.
Figure 4B:
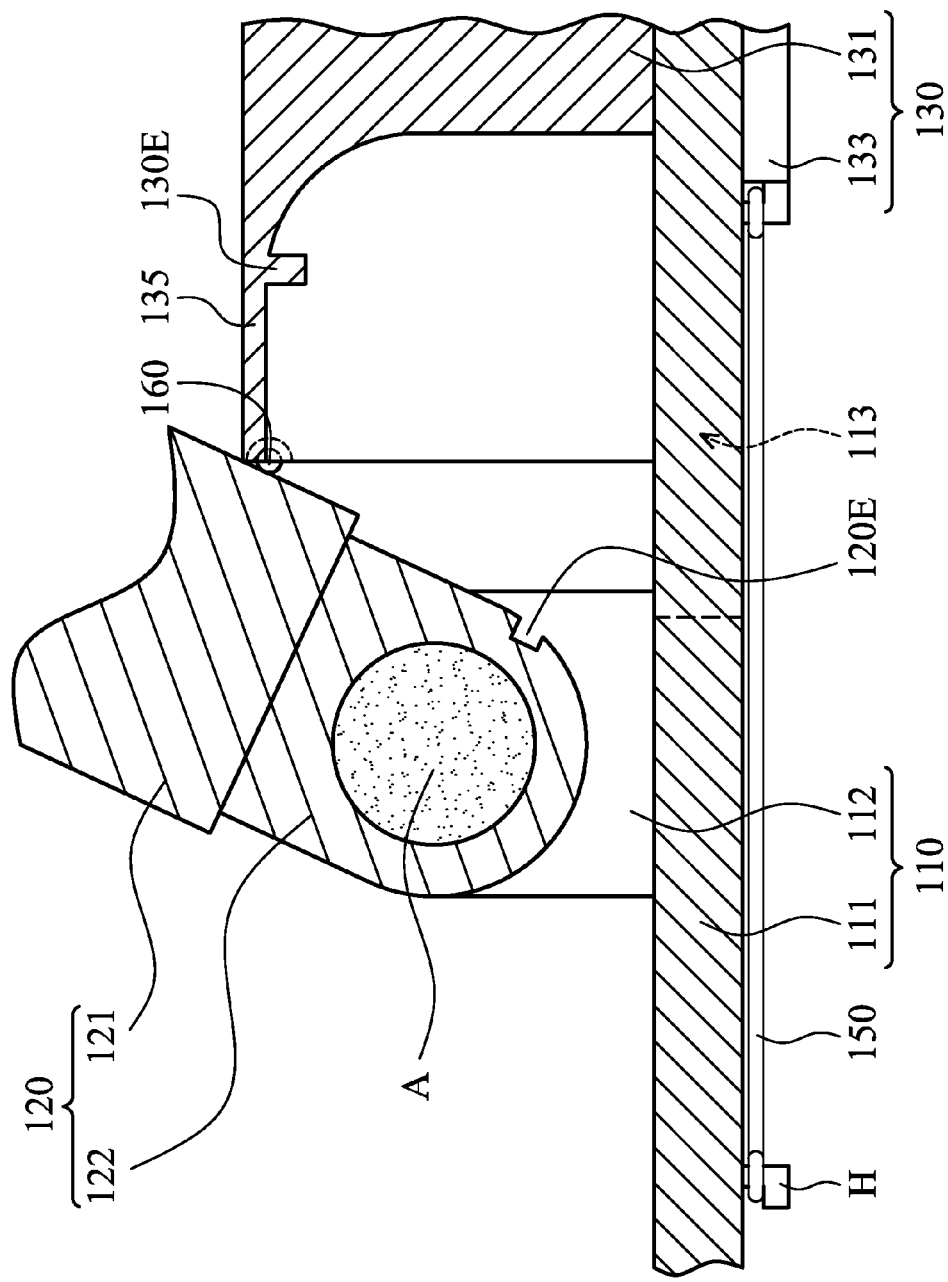

Referring to FIGS. 2A and 2B, the electronic device 100 of the invention, for example a portable computer, comprises a base 110, a first cover 120, a second cover 130, at least one connecting ports 140, an elastic member 150, a rotating member 160, the input unit I and a display unit D (the elastic member 150 and the rotating member 160 are shown in FIGS. 4A and 4B). As shown in FIG. 2B, the input unit I, disposed on the base 110, comprises a keyboard and a mouse. The display unit D, disposed on the first cover 120, comprises a liquid crystal display. A opening of the base 110 is provided corresponding to a opening of the second cover 130, thus an accommodating space S is formed for receiving the connecting ports 140. As a result, the problem of the height H2 of the connecting ports 140 being greater than the thickness H1 of the base 110 is overcome. In other words, the thickness H1 of the base 110 and the thickness H3 of the cover (the first cover 120 or the second cover 130) are utilized in the embodiment to accommodate the connecting ports 140.

Figure 3:
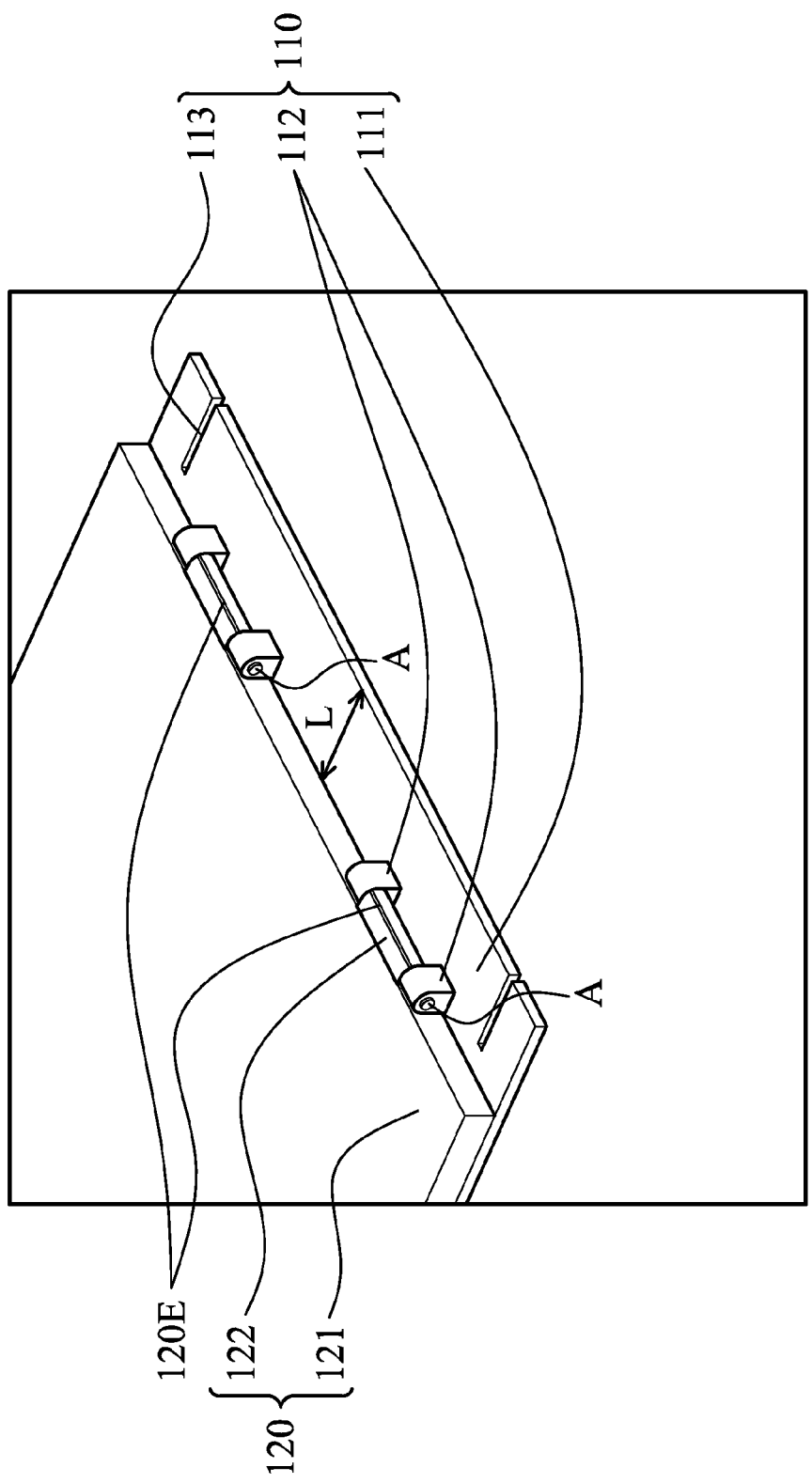
FIG. 3 is a schematic view showing a base and a first cover of the electronic device of the invention.

Referring to FIG. 3 and FIGS. 2A and 2B, the first cover 120 pivots relative to the base 110 according to an axle A (as shown in FIG. 4A and 4B), such that the first cover 120 is able to be rotated between a first position (a closed status as shown in FIG. 2A) and a second position (an open status as shown in FIG. 2B) relative to the base 110. In detail, the first cover 120 comprises a first body 121 and a first connecting member 122, and the base 110 comprises a second body 111 and a second connecting member 112. The axle A passes through the first connecting member 122 and the second connecting member 112 to connect the first cover 120 to the base 110.

It should be noted that a distance L is kept between the axle A and the edge of the base 110, which means the first cover 120 is pivotally disposed on the upper surface of the base 110 instead of at the edge of the base 110. Therefore, the connecting ports 140 are able to be disposed in the space between the edge of the base 110 and the axle A (defined by the distance L) and corresponded to the underside of the second cover 130.

Referring to FIG. 3 and FIGS. 4A and 4B, the second cover 130 comprises a third body 131 and a slide track 133. The third body 131 comprises a cover portion 135 on its front side. The base 110 further comprises a slide groove 113 (as shown in FIG. 3) corresponding to the slide track 133. By sliding the slide track 133 in the slide groove 113, the second cover 130 is able to be movably disposed on the base 110 between a third position (corresponding to the closed status as shown in FIGS. 2A and 4A) and a fourth position (corresponding to the open status as shown in FIGS. 2B and 4B).

Moreover, the first cover 120 further comprises a first engaging member 120E disposed on the first connecting member 122, and the second cover 130 further comprises a second engaging member 130E, corresponding to the first engaging member 120E, disposed on the interior surface of the second cover 130. When the second cover 130 is at the third position, the second engaging member 130E engages with the first engaging member 120E (as shown in FIG. 4A), and when the second cover 130 is at the fourth position, the second engaging member 130E is separated from the first engaging member 120E (as shown in FIG. 4B). Thus, inadvertent separation of the second cover 130 from the first cover 120 is prevented.

It should be noted that in the embodiment, the first engaging member 120E is a recess, and the second engaging member 130E is a protrusion, but it is not limited thereto. The first engaging member 120E can be a protrusion, and the second engaging member 130E can be a recess, as long as the first engaging member 120E and the second engaging member 130E are firmly engaged with each other.

Additionally, the base 110 further comprises a fixing portion H disposed on the lower surface of the second body 111, wherein the fixing portion H comprises a hook. The elastic member 150 is for example a spring. One end of the spring is hooked to the fixing portion H and the other end of the spring is connected with the slide track 133. Accordingly, when the second cover 130 is moved from the third position (corresponding to the closed status) to the fourth position (corresponding to the open status), the elastic member 150 is stretched by the slide track 133 to deform and store elasticity therein. When the elasticity of the elastic member 150 is released, the second cover 130 is able to be moved from the fourth position (corresponding to the open status) to the third position (corresponding to the closed status).

The rotating member 160 comprises a spherical member or rotating wheel, rotatably disposed on the second cover 130 and abutting the first cover 120. When the first cover 120 is rotated from the first position to the second position, or from the second position to the first position, the rotating member 160 is rotated abuttingly along the surface of the first cover 120, which help to rotate smoothly and prevent from being scratched.

The operation of opening and closing the first cover 120 is described below. As shown in FIGS. 2A and 4A, the first cover 120 is at the first position and the second cover 130 is at the second position. That is, the first cover 120 is closed relative to the base 110. In this condition, the cover portion 135 of the third body 131 covers the axle A, the first connecting member 112 and the second connecting member 122 in order not to be seen from outside, thus increasing overall esthetics. The first engaging member 120E engages with the second engaging member 130E.

Next, as shown in FIGS. 2B and 4B, to open the first cover 120 relative to the base 110, the first cover 120 is lifted to rotate according to the axle A to the second position. During rotation, the first engaging member 120E disengages the second engaging member 130E, and the first cover 120 pushes the second cover 130 from the third position to the fourth position; meanwhile, the rotating member 160 is rotated abuttingly along the surface of the first cover 120 so that the first cover 120 and the second cover 130 are prevented from being scratched and rotating smoothness is enhanced; and the elastic member 150 is stretched along with the movement of the slide track 133 of the second cover 130 to store elasticity therein.

Then, when the user rotates the first cover 120 from the second position to the first position, the second cover 130 is moved from the fourth position to the third position via the elasticity released from the elastic member 150 although the user doesn't apply force to the second cover 130 directly. Also, the second engaging member 130E again engages with the first engaging member 120E.

The electronic device of the invention utilizes the thickness H1 of the base 110 and the thickness H3 of the second cover 130 to accommodate the connecting ports 140 at the rear side of the electronic device 100. This allows a system designer to have more freedom for arranging components within the system and results in a lighter product. Moreover, due to the disposition of the rotating member 160, scratches which may generated on the surface of the electronic device 100 are prevented and rotating smoothness is improved. At last, the second cover 130 is utilized to cover the connection between the first cover 120 and the base 110, increasing overall esthetics.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a base;
   a first cover rotatably disposed on the base between a first position and a second position, wherein when the first cover is at the first position, the cover is closed relative to the base, and when the first cover is at the second position, the cover is open relative to the base; and
   a second cover movably disposed on the base between a third position and a fourth position;
   wherein when the first cover is rotated from the first position to the second position, the second cover is pushed thereby from the third position to the fourth position.

2. The electronic device as claimed in claim 1, wherein the first cover is pivoted to the base according to a axle.

3. The electronic device as claimed in claim 2, wherein a distance is formed between the axle and a edge of the base.

4. The electronic device as claimed in claim 2, wherein the first cover comprises a first body and a first connecting member, the second cover comprises a second body and a second connecting member, and the axle passes through the first connecting member and the second connecting member to connect the first cover and the base.

5. The electronic device as claimed in claim 4, wherein the first cover further comprises a first engaging member disposed on the first connecting member, the second cover further comprises a second engaging member corresponding to the first engaging member, and when the second cover is at the third position, the second engaging member is engaged with the first engaging member, and when the second cover is at the fourth position, the second engaging member is separated from the first engaging member.

6. The electronic device as claimed in claim 5, wherein the first engaging member comprises a recess, and the second engaging member comprises a protrusion.

7. The electronic device as claimed in claim 5, wherein the first engaging member comprises a protrusion, and the second engaging member comprises a recess.

8. The electronic device as claimed in claim 4, wherein the second cover covers the axle, the first connecting member and the second connecting member when the second cover is at the third position.

9. The electronic device as claimed in claim 1, further comprising a rotating member rotatably disposed on the second cover and abutting the first cover, wherein when the first cover is rotated from the first position to the second position or from the second position to the first position, the rotating member is rotated along a surface of the first cover.

10. The electronic device as claimed in claim 1, wherein the first cover comprises a first engaging member, and the second cover comprises a second engaging member, and when the second cover is at the third position, the second engaging member is engaged with the first engaging member, and when the second cover is at the fourth position, the second engaging member is separated from the first engaging member.

11. The electronic device as claimed in claim 1, wherein the base comprises a slide groove, the second cover comprises a slide track, and when the second cover is moved relative to the base, the slide track slides in the slide groove.

12. The electronic device as claimed in claim 11, wherein the base further comprises a fixing portion, and the electronic device further comprises an elastic member with two ends respectively connected to the fixing portion and the slide track.

13. The electronic device as claimed in claim 1, wherein the base comprises a opening and the second cover also comprises an opening corresponding to the opening of the base to form an accommodating space.

14. The electronic device as claimed in claim 13, further comprising a connecting port disposed in the accommodating space.

15. An electronic device, comprising:
   a base comprising an opening;
   a first cover rotatably disposed on the base between a first position and a second position, wherein when the first cover is at the first position, the cover is closed relative to the base, and when the first cover at in the second position, the cover is open relative to the base;
   a second cover movably disposed on the base between a third position and a fourth position and comprising an opening corresponding to the opening of the base to form an accommodating space;
   at least one connecting port disposed in the accommodating space; and
   an elastic member comprising two ends respectively connected with the base and the second cover;
   wherein when the first cover is rotated from the first position to the second position, the second cover is pushed thereby from the third position to the fourth position.

16. The electronic device as claimed in claim 15, further comprising a rotating member rotatably disposed on the second cover and abutting the first cover.

17. The electronic device as claimed in claim 15, wherein the base comprises a slide groove, the second cover comprises a slide track, and when the second cover is moved relative to the base, the slide track slides in the slide groove.

18. The electronic device as claimed in claim 17, wherein the first cover further comprises a first engaging member, and the second cover further comprises a second engaging member corresponding to the first engaging member, and when the second cover is in the third position, the second engaging member is engaged with the first engaging member, and when the second cover is in the fourth position, the second engaging member is separated from the first engaging member.

19. The electronic device as claimed in claim 18, wherein the base further comprises a fixing portion, and the elastic member respectively is connected the fixing portion and the slide track.

20. The electronic device as claimed in claim 19, wherein the electronic device comprises a portable computer.

* * * * *